United States Patent [19]

Kondo

[11] 4,076,385

[45] Feb. 28, 1978

[54] LIQUID CRYSTAL DISPLAY DEVICE

[75] Inventor: Kenichi Kondo, Tokyo, Japan

[73] Assignee: Kabushiki Kaisha Daini Seikosha, Japan

[21] Appl. No.: 604,783

[22] Filed: Aug. 14, 1975

[30] Foreign Application Priority Data

| | | |
|---|---|---|
| Aug. 14, 1974 | Japan | 49-93069 |
| Sep. 4, 1974 | Japan | 49-101483 |

[51] Int. Cl.$^2$ .......... G02F 1/18; G08B 5/36

[52] U.S. Cl. .......... 350/332; 40/336; 340/324 M

[58] Field of Search .......... 350/160 LC; 340/336, 340/324 M

[56] References Cited

U.S. PATENT DOCUMENTS

| | | | |
|---|---|---|---|
| 3,740,717 | 6/1973 | Huener et al. | 350/160 LC X |
| 3,877,016 | 4/1975 | Jorgensen | 340/336 |
| 3,891,306 | 6/1975 | Mitomo et al. | 350/160 LC |
| 3,902,169 | 8/1975 | Washizuka | 340/336 |

*Primary Examiner*—John K. Corbin
*Assistant Examiner*—Rolf Hille
*Attorney, Agent, or Firm*—Robert E. Burns; Emmanuel J. Lobato; Bruce L. Adams

[57] ABSTRACT

This invention relates to a liquid crystal display device, for driving a plurality of digits of liquid crystal display sequentially by using a time-sharing system.

3 Claims, 11 Drawing Figures

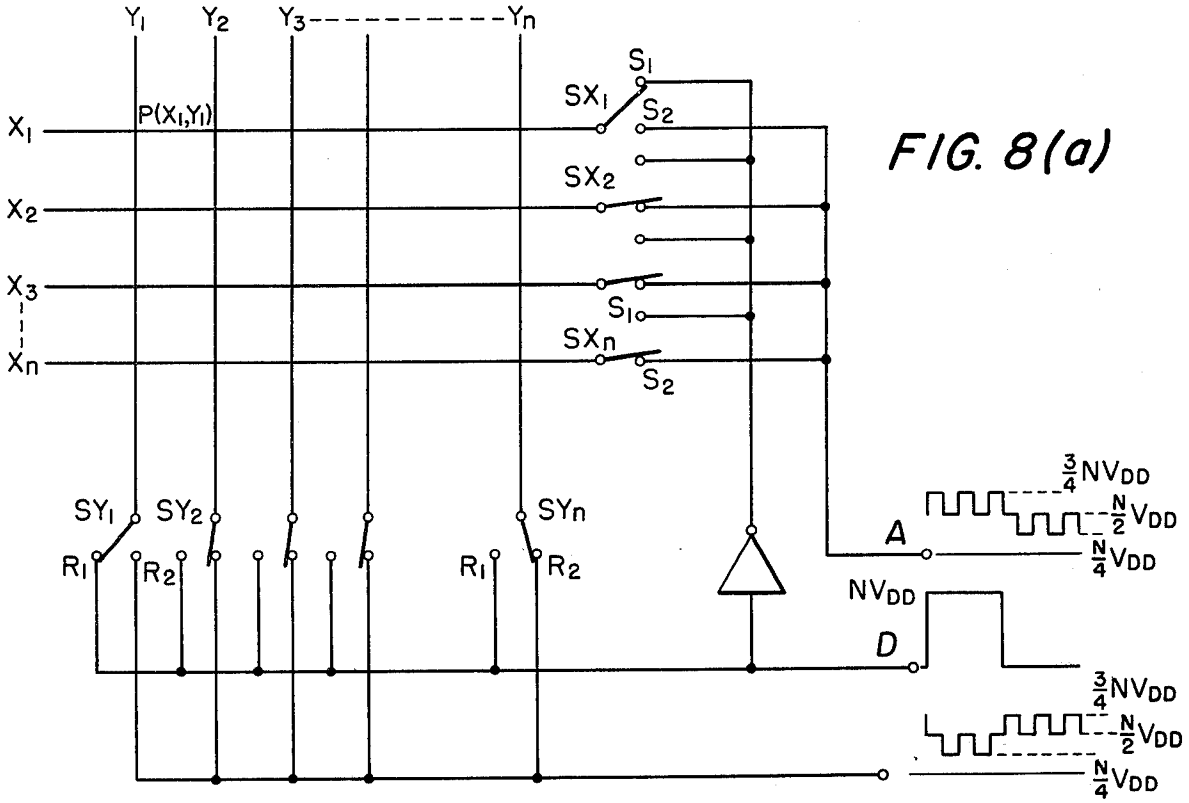
FIG. 8(a)
FIG. 8(b)
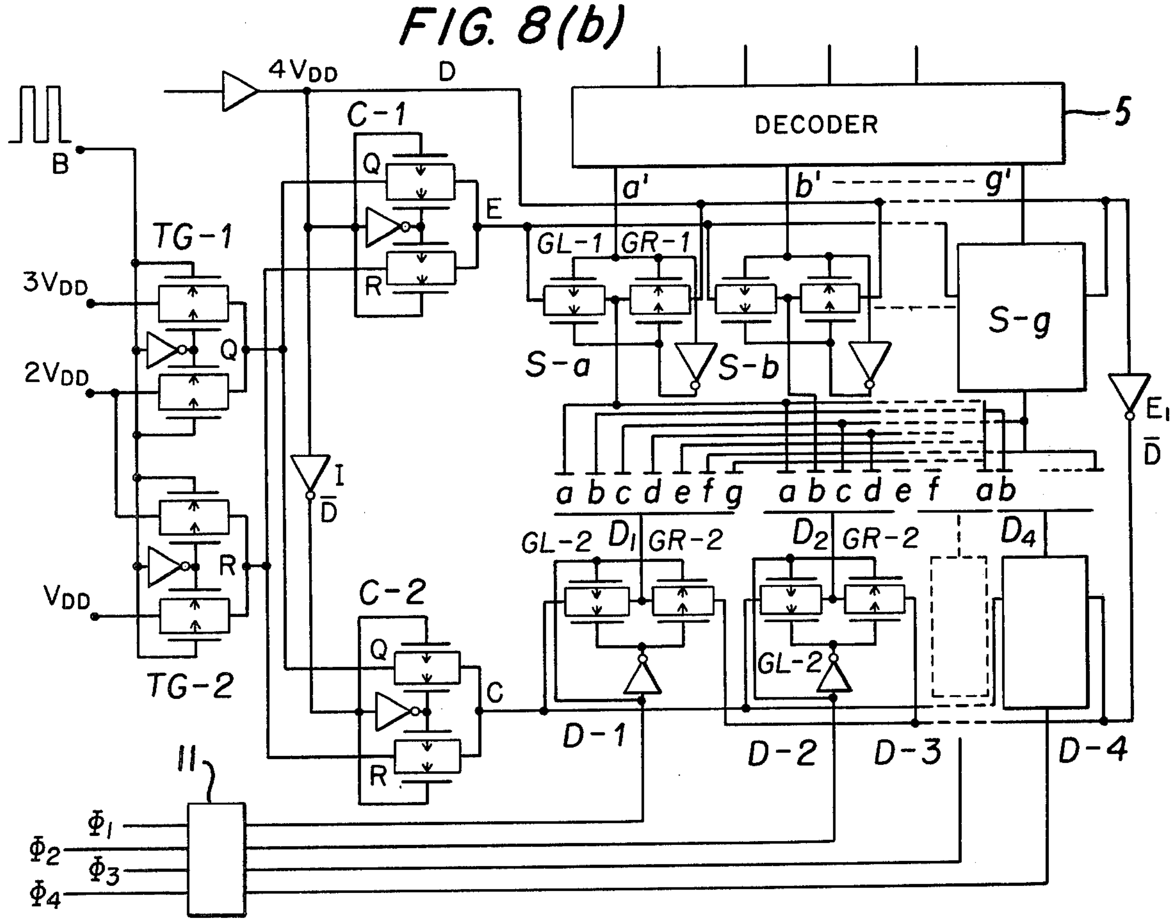

LIQUID CRYSTAL DISPLAY DEVICE

BACKGROUND OF THE INVENTION

This invention relates to a liquid crystal display device.

In the conventional type, a static system was employed as the driving circuit for the liquid display device. Therefore, a common electrode and 8-shaped electrodes having seven segment electrodes are mounted to from each of the figure electrodes, and a decoder for generating the segment signal in each of the figure electrodes is employed for controlling said segment voltage for applying the voltage having the in-phase and anti-phase relation to a common figure electrode of the operational and non-operational segment. According to said static system, since it is needed to mount the decoder for individual figures, the IC-chip becomes larger and the cost becomes higher. Further, since the number of connecting parts between the liquid crystal display device and the printed circuit board are increased, the reliability of said connector becomes worse. Since each segments in said each figures are independent, a number of wire-bonding portions are increased; and it is not preferable from the stand point of reliability and cost.

OBJECT OF THE INVENTION

The present invention aims to eliminate the above noted difficulty and insufficiency, and therefore it is the primary object of the present invention to provide a means of driving a plurality of digits of liquid crystal using a time-sharing system.

Further object of the present invention is to provide a number of leads and high reliability.

Furthermore, another object of the present invention is to provide a liquid crystal display device having a preferable displaying contrast and low cost.

SUMMARY OF THE INVENTION

In a liquid crystal display device, a plurality of digits of a liquid crystal display are driven by a time-sharing system having a divider, a plurality of counters, a gate-circuit for transmitting information of the output of said counters in a time-sharing system, a gate signal generator, a segment electrode signal generating circuit, a figure electrode signal generating circuit, a decoder, a segment electrode selecting circuit and a figure electrode selecting circuit.

BRIEF DESCRIPTION OF THE DRAWINGS

The above noted objects, features and advantages of the present invention will become more obvious from the following description when taken in connection with the accompanying drawings, which show one preferred embodiment and another embodiment wherein:

FIG. 6(*b*) shows wave shapes of the voltage wave which are applied to the liquid crystal;

FIG. 8(*a*) shows a principal circuit for explaining a second embodiment;

FIG. 8(*b*) shows a second embodiment of the present invention; and

DESCRIPTION OF THE PREFERRED EMBODIMENTS

Figure 1:
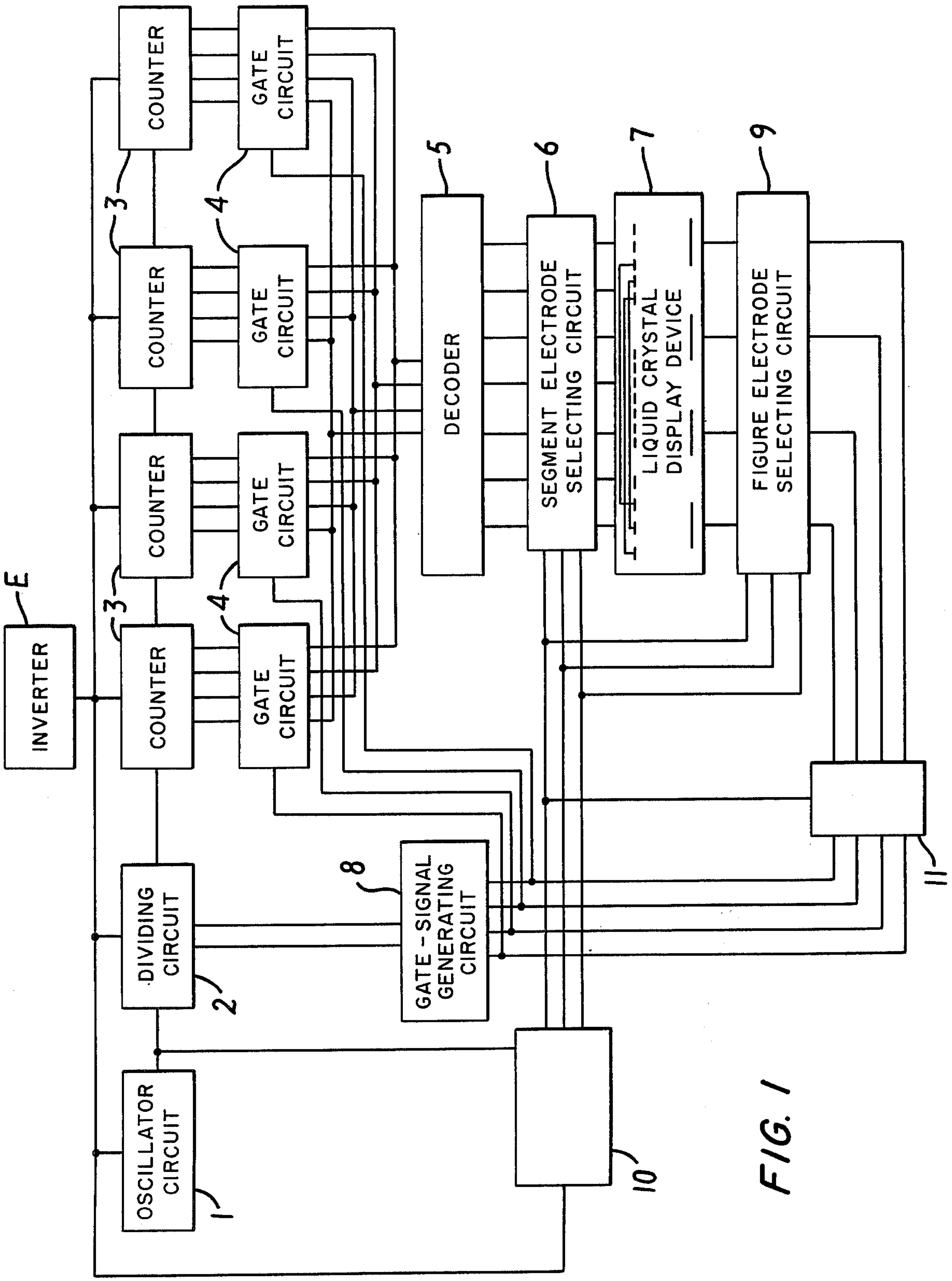
FIG. 1 shows a block diagram of the first embodiment of the present invention.

Referring now to the first embodiment of the present invention illustrated in the accompanying drawings in: FIG. 1 by a block diagram, the output of the oscillator circuit 1 using a quartz vibrator is divided to 1HZ or 1/60 HZ via the dividing circuit 2, and the output of said dividing circuit 2 is applied to the counter 3 and is counted.

The output of said counter 3 periodically applys the to the decoder 5 only during a certain time via a plurality of gate circuits 4 for the time-sharing binary-coded decimal counter output is applied to said decoder 5 for changing to the segment signal, and the output of said decoder 5 is applied to the segment electrode selecting circuit 6 for driving the liquid crystal display device 7 whereby said output of said decoder 5 is changed to the signal for enabling the display by the segment signal or other signal. The gate-signal of said gate circuit 3 for the time-sharing mode of the counter 3 output is generated by the gate-signal generating circuit 8, and the gate-signal selects the figure electrode. Further, the driving circuit 6 and the figure electrode selecting circuit 9 employ three kinds of direct current voltage for selectively applying the operational voltage to the segment signal of said decoder 5.

Figure 2:
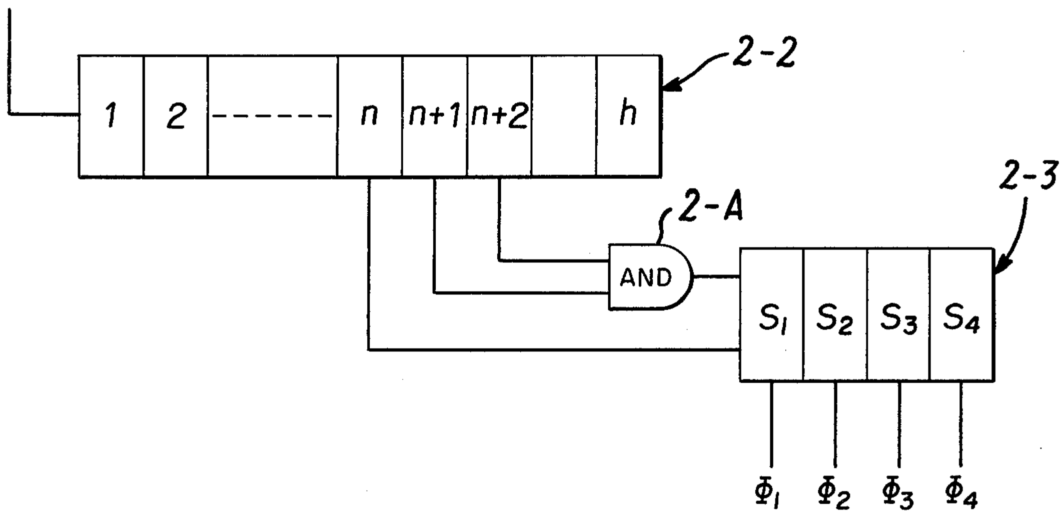
FIG. 2 shows a gate signal generating circuit.
Figure 3:
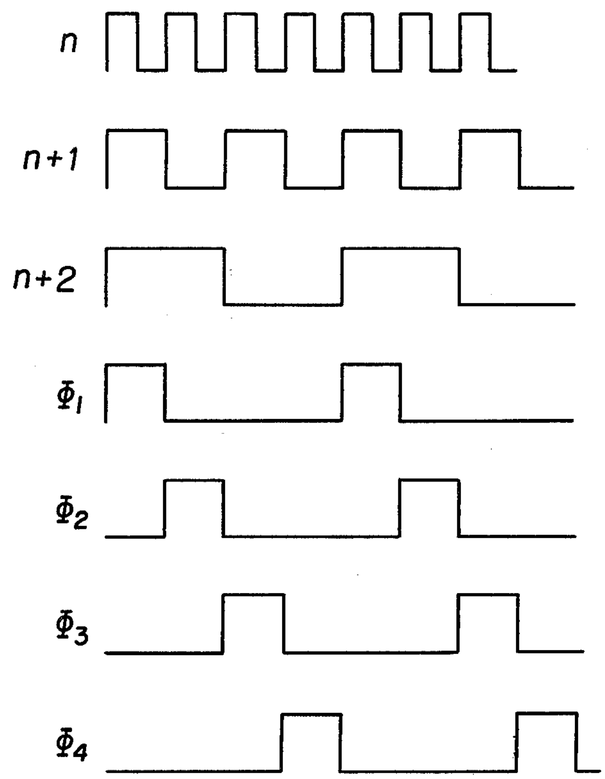
FIG. 3 shows wave shapes relating to said generating circuit in FIG. 2.

Further referring now to the operation of the driving circuit of the present invention: FIG. 2 shows the block-diagram of the gate signal generating circuit for sequentially generating the gate-signal of being delayed in a certain time and applied to each gate circuits for transmitting by the time-sharing mode the output of each counter circuit. When the outputs of n+one-stage and n+two-stages of the dividing circuit 2-2 are applied to the AND-circuit 2A a pulse signal of ¼ duty is obtained. The gate signals of $\phi_1$, $\phi_2$, $\phi_3$ and $\phi_4$ which are respectively delayed during the term of the clock signal are obtained to each output stages by applying the output signal of said dividing circuit 2-2 to the shift-register 2-3 having four stages and using the output of the n-stage as the clock signal. The wave-shapes of said shift-register 2-3 output gate signals are indicated in FIG. 3. As above noted the gate circuit 4 (analogue switching circuit) is operated by the gate signal whereby the output signal of said counter circuits 3 which was operated in the time-sharing are sequentially applied to said decoder 5 and mode are transferred to the segment signals.

Figure 4:
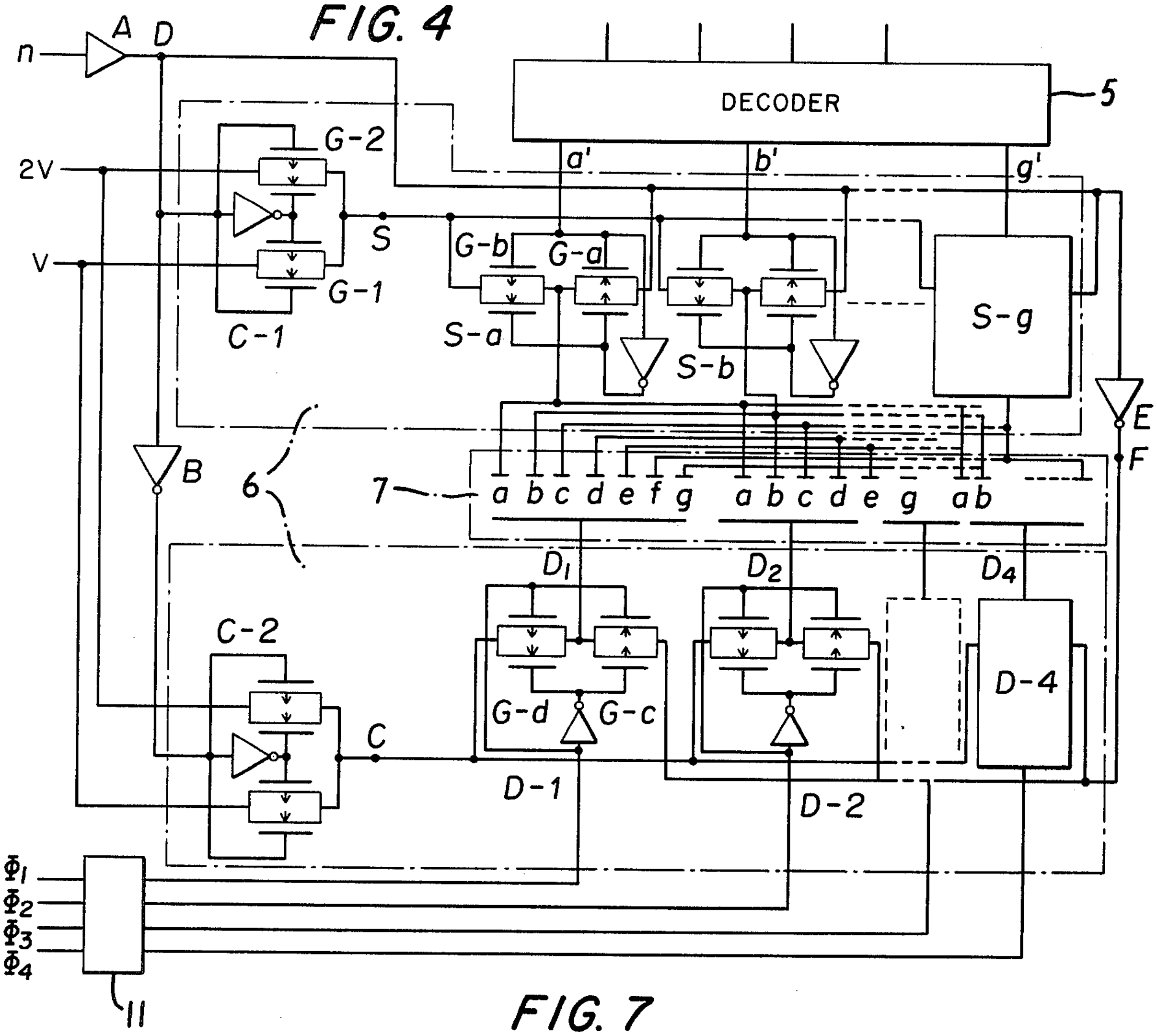
FIG. 4 shows one embodiment of a driving circuit of the present invention.

FIG. 4 shows the driving circuit having the power voltage of +3V. The output "*s*" of the segment electrode signal generating circuit C-1 develops two signal levels, +2V and +V. The segment signal generating circuit C-1 has the control signal in which the gate signal "*n* " is amplified to the voltage of +3V by the level-shifter A, and is applied to the transmission gate having two inputs of V and 2V. Therefore, when the voltage of +3V is applied to the point "Q", the gate G-1 is opened and other gate G-2 is closed whereby the voltage of +V appears at the point "S". On the other hand, when the voltage of 0V is applied to the point "Q", the gate G-1 is closed and other gate G-2 is opened whereby the voltage of +2V appears. The output "C" the figure electrode signal generating circuit C-2 is the signal of delayed by a phase shift T/2 by the control signal "*n*" reversed by the inverter "B".

Figure 5:
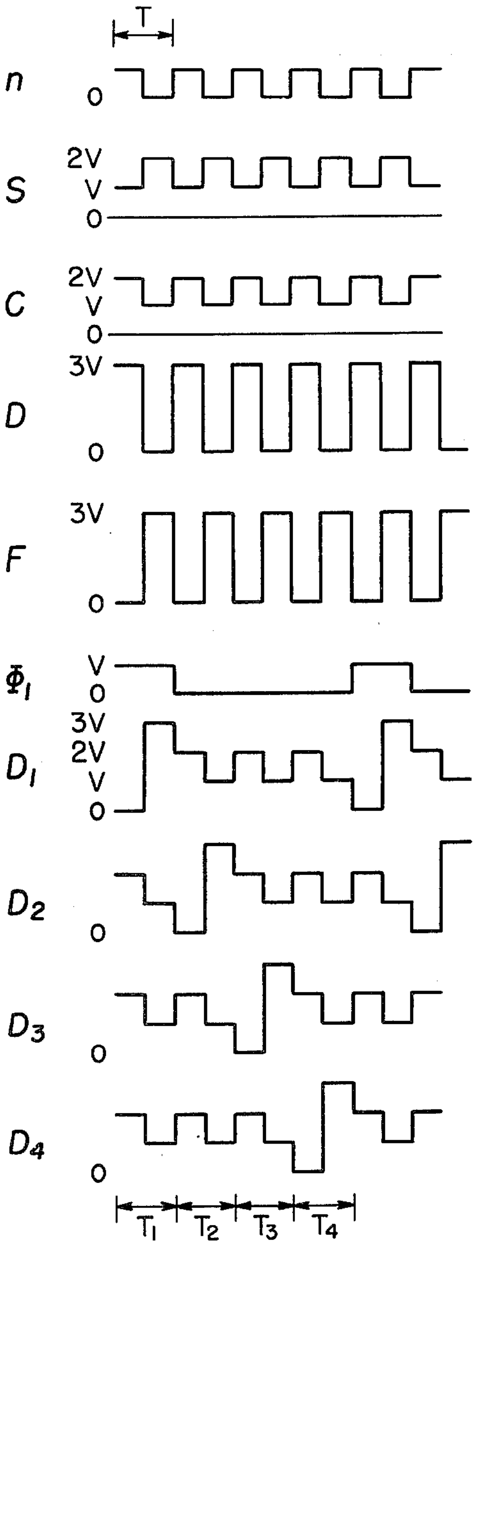
FIG. 5 shows wave shapes of the figure electrode.

The gate signal "*n*" is amplified to the segment selecting signal "D" having the amplitude of +3V, said segment selecting signal "D" and the output "S" of said segment electrode signal generating circuit "C-1" respectively become the input of the seven-transmission gates. The control signals of the transmission gates are composed of the segment signals *a', b'* . . . *g'* of said decoder 5, the reference characters S-*a*, S-*b* . . . S-*g* designate the segment electrode selecting circuit. If the signal "*a'*" was the output signal of +3V, the gate G-*a* of said segment electrode selecting circuit S-*a* is opened, and then the segment selecting signal "D" is applied to the electrode "*a*" only during time T. On the other hand, if the electrode "*a'*" was "*o*", the output "S" of said segment electrode signal generating circuit C-1 is applied by the gate G-*b* which is opened and the gate G-*a* which is closed. Further, the figure electrode driving circuit for selecting and driving the figure electrode is a transmission gate having two inputs for respectively receiving the figure selecting signal "F" and the output C of said figure electrode signal generating circuit C-2, the figure selecting signal "F" being the segment selecting signal "D" are reversed by the inverter E. The control signal $\phi_1$, $\phi_2$ — $\phi_4$ of said figure electrode selecting circuits D-1, D-2 - D-4 are the gate control signal $\phi_1$ - $\phi_4$ which are generated by said shift-register 2-3. If the gate control signal $\phi_1$ was positive, the figure selecting signal "F" is applied to the figure electrode $D_4$ by the gate G-C of the right side of said figure electrode selecting circuit D-1 which is opened. On the contrary, when the gate control signal $\phi_1$ is 0 -volt, the gate G-d on the left side is opened and the gate G-C is closed whereby the output of said figure electrode signal generating circuit C-2 is applied. Therefore, the voltages as indicated in FIG. 5 are respectively applied to said figure electrodes $D_1$ - $D_4$ during the time T.

Figure 7:
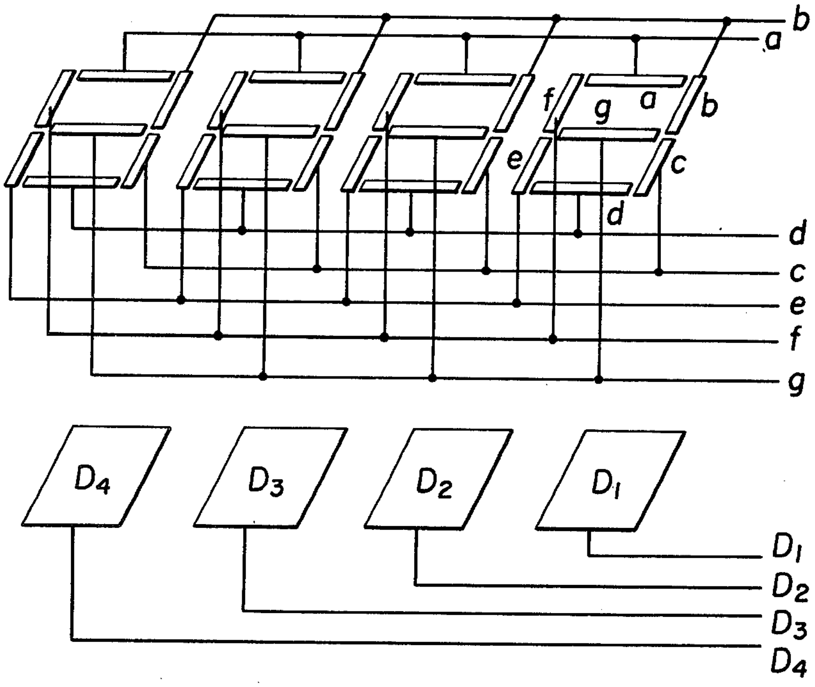
FIG. 7 shows electrode arrangement.
Figure 6A:
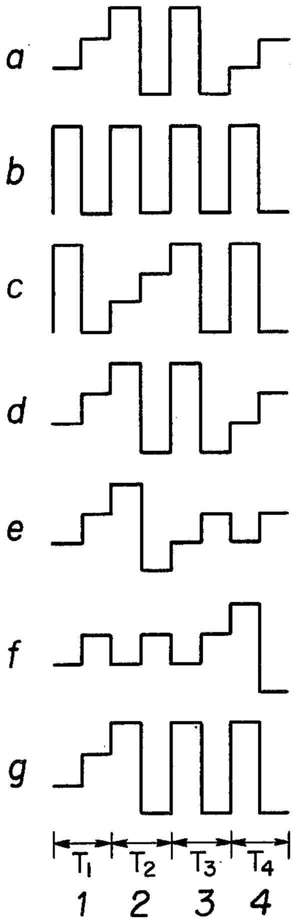
FIG. 6(*a*) shows wave shapes of the segment electrode.
Figure 6B:
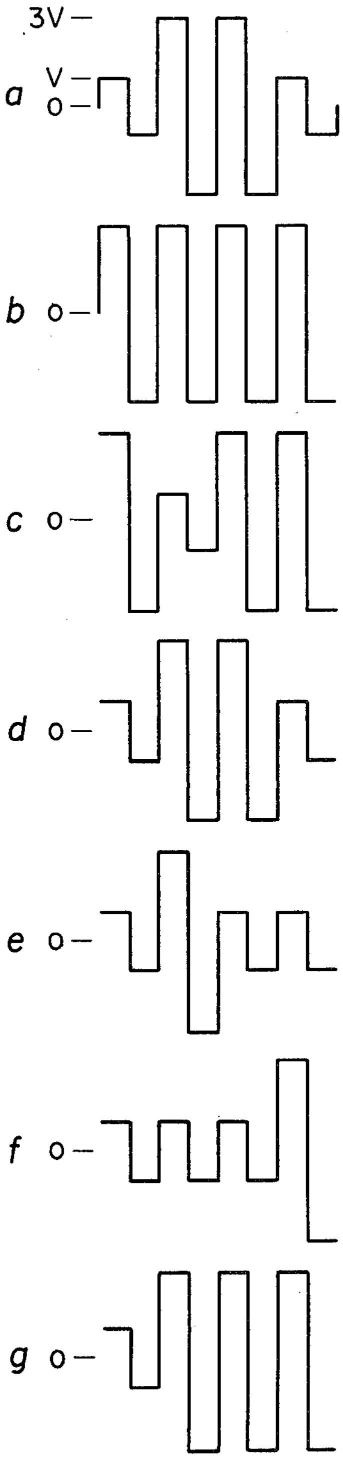

The segment electrodes of said liquid crystal display element according to the present invention are indicated in FIG. 7, said segment electrodes are arranged in a figure eight. The figure electrodes are independently mounted for each figure, and the corresponding segment electrodes for each figure commonly connected. For example, the voltage wave shapes in which numerals 1–4 are displayed at said figures 1–4 are indicated in FIG. 6(*a*), then the voltage for applying between the liquid crystals are indicated in FIG. 6(*b*). As clearly indicated in the applied voltage, when the threshold voltage of said liquid crystal is set to less than the voltage, in the selection of the segment, an alternating voltage of ±3V is applied. The voltage of 2V - 3V for operating the liquid crystal phenomenon is able to display with preferable contrast. Further in the state of no selection of the figure electrode, a non-selected segment is not displayed and the selected segment is not displayed, namely the problem of cross-talk by the voltage of 2V or V which are applied to the figure electrode is eliminated. Therefore, the voltage of ±V is usually applied to said non-selected segment and this voltage is lower than the threshold voltage, further this voltage is an alternating-voltage whereby the life of the liquid crystal is not harmed.

According to the first embodiment of the present invention, it is not needed to respectively mount the decoders for each of the figures, it is possible to obtain a small IC-chip device for all and to reduce the number of connections between the liquid display device and the electronic circuit board and to improve the reliability of said connector.

Further according to the present invention, it is to reduce the number of wire-bonds for the IC-chip and to obtain a low-cost for the packaging of said IC. Further it is possible to easily construct the circuit by the C-MOS transistor whereby it is able to attain a small power consumption.

The voltage of ±V which is a non-operational voltage is applied to the non-selected segment whereby the problem of the cross talk is resolved. The voltage of ±3V which is an operational voltage is applied to the selected segment and enables the display of said liquid crystal whereby the contrast is preferable, and it is possible to obtain the broad operational voltage and to prolong the life of said liquid crystal by the driving of alternating current.

Referring now to the second embodiment and the principal explanation of the present invention in conjunction with the accompanying drawing of FIG. 8(*a*).

The structure illustrated in FIG. 8(*a*) is composed of the horizontal electrodes $X_1$, $X_2$, $X_3$ . . . X*n*, the vertical electrodes $Y_1$, $Y_2$, $Y_3$ . . . Y*n*, the first switch group includng a plurality of switches $SX_1$, $SX_2$ . . . SX*n* for selecting said horizontal electrodes and second switch group including a plurality of switches $SY_1$, $SY_2$ . . . SY*n* for selecting said vertical electrodes.

Therefore, to select the cross point portion P ($X_1$, $Y_1$), the contact portion $S_1$ of said switch SX, is closed, the contact portion $R_1$ of said switch $SY_1$ is closed.

On the other hand, since the other cross point portions are not selected, the contacts of switches $SX_2$, . . . , SX*n* are closed to the stationary contact $S_2$, the contact of said switches $SY_2$ . . SY*n* are closed to contacts $R_2$.

The first pulse voltage NVDD which is N times said standard voltage VDD is applied to the contact $R_1$, the second pulse voltage which is opposite in polarity to said first pulse voltage NVDD is applied to said contact $S_1$.

The fourth signal voltage is applied to the contact $S_2$, said fourth signal voltage has a direct current voltage of N/2 times said standard voltage and opposite polarity to said first pulse in one semi-period (one half period) and a direct current voltage of N/4 times in another semi-period, and has a signal voltage which is overlapped by the third pulse which is substantially higher than the repeated frequency of said first pulse and is N/4 times said standard voltage VDD and is equivalent to an average voltage of said first pulse voltage.

Further, the voltage which has an opposite polarity to said fourth signal voltage is applied to the contact R.

Consequently, the signal voltage ± NVDD is applied to the selected point "P" ($X_1$, $Y_1$) by applying the signal voltage, and on the other hand, the maximum signal voltage $\pm \frac{3}{8}$ NVDD is applied to the other non-selected points.

Therefore, the liquid crystal display element of the selected point ($X_1$, $Y_1$) is displayed, and another display element of the non-selected points and semi-selected points are not displayed by employing the liquid crystal display element having a preferable threshold voltage.

FIG. 8(*b*) shows one embodiment of the display device of the present invention, which is composed of the signal selecting circuit TG-1 and TG-2, the segment electrode signal generator circuit C-1, the figure electrode signal generator circuit C-2, the segment electrode selecting circuit S-*a*, S-*b*, . . . and S-*g*, the figure electrode selecting circuit D-1, . . . , D-4 and the liquid display device.

FIG. 8(*b*) shows the embodiment of N = 4 (the magnification "N") to the current voltage VDD in FIG. 8(*a*) by the booster circuit 10.

Said signal selecting circuit TG-1 and TG-2 are composed of a transmission-gate, and respectively have two input signals of (3VDD and 2VDD) and (2VDD and VDD). The wave-characteristics in FIG. 5 are obtained at the point "Q" and "R" by employing the signal "B" having a higher frequency than said clock signal "*n*" as the control signal.

Said segment electrode signal generator circuit "C-1" and said figure electrode signal generator circuit "C-2" respectively composed of a two-input transmission-gate for receiving the two signals "Q" and "R". The control signal of said segment electrode signal generator circuit "C-1" receives the voltage 4VDD by developed amplifying said clock signal "*n*".

The control signal of said figure electrode control signal generator circuit "C-2" is the inversed "$\overline{D}$" signal developed by the inverter "I".

Figure 9:
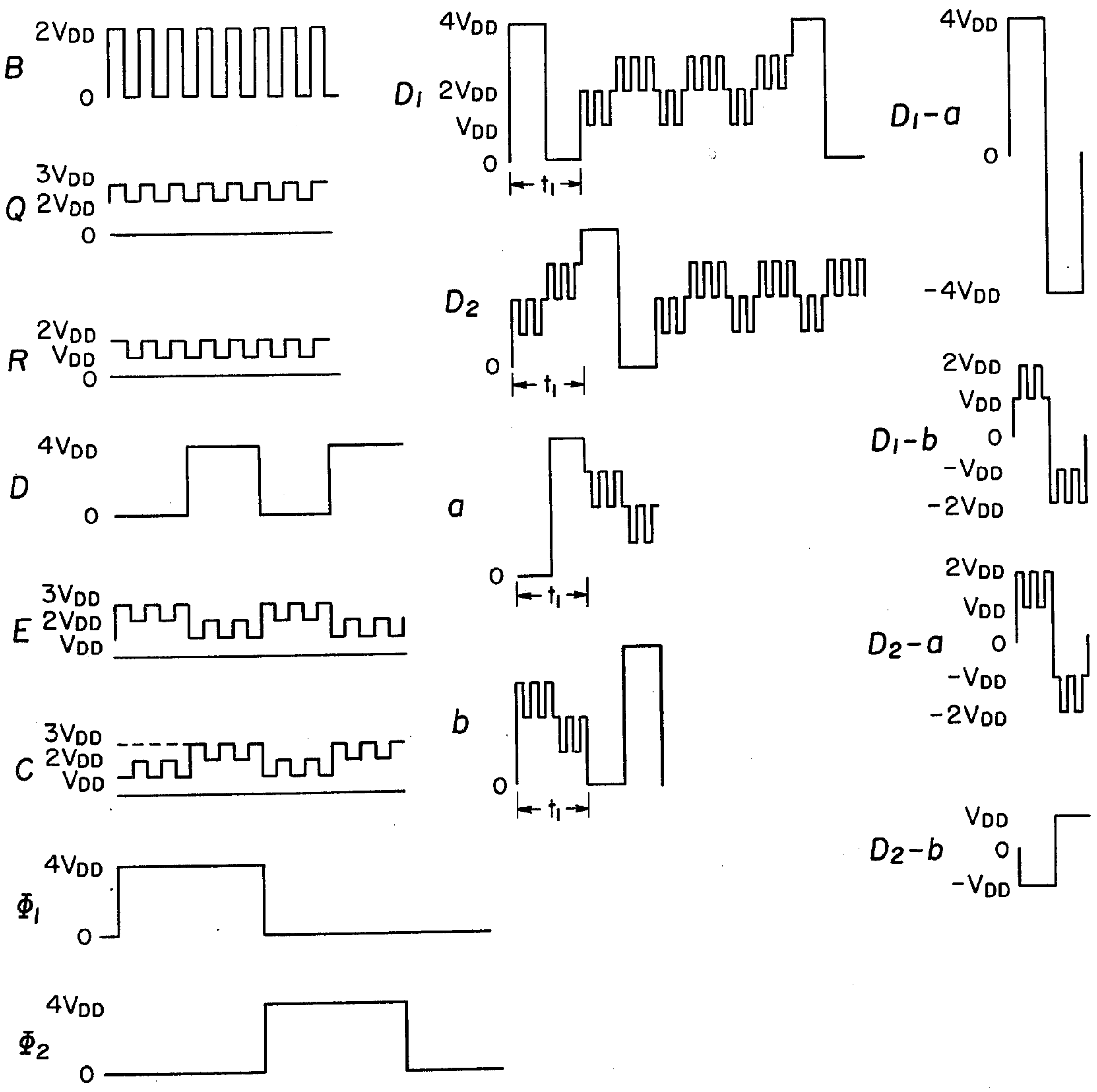
FIG. 9 shows wave shapes in the second embodiment shown in FIG. 8(*b*).

Consequently, the wave-characteristics of E and C in FIG. 9 are obtained at the output terminals of said figure electrode signal generator circuit "C-2".

The segment electrode selecting circuit "S-*a*", "S-*b*" . . . *and* "*S-g*" which employ signals of "E" and "D" is composed of a transmission-gate, the control signal of said segment electrode selecting circuit is the segment signals $a' \sim g'$ of said decoder 5.

For example, the segment signal "*a*'" is selected to display the figure D, the gate GR-1 of said segment electrode selecting circuit S-*a* is opened then the signal "D" is applied during the time "*t*" of closing the gate "GL-1".

On the other hand, said figure electrode selecting circuits "D-1" ~ "D-4" are each composed of a transmission-gate, each of said figure electrode selecting circuit have two inputs of signal $\overline{D}$ which inverts the figure electrode control signal C and clock signal D. The control signals are respectively composed of said figure selecting signals.

The figure electrode selecting circuit D-1 is selected and the gate GR-2 is opened, then $\overline{D}$ signal having the average voltage of only 3/2 VDD by applying said figure electrode control signal C is applied to said figure electrodes $D_2 \sim D_4$ by closing said gate "GL-2".

In the same way, the average voltage of 3/2 VDD is respectively applied between said segment electrode 37 *a*" and another figure electrodes $D_2 \sim D_4$.

The voltage of only ± VDD is applied between other non-selected figure electrodes $D_2 \sim D_4$, consequently non-selected and semi-selected segments are not displayed since the signal voltage less than the threshold voltage is applied to said segments.

Further, since said signal voltage is alternately applied between said liquid crystal segments, the life of said liquid crystal is not reduced. These facts are clearly indicated on the operational wave form in FIG. 9.

Further, FIG. 7 shows the electrode arrangement of the display device of the matrix type.

According to the above-embodiment, the signal voltage ± NVDD is applied to the selected point, the signal voltage ± $\frac{3}{8}$ NVDD is applied to the semi-selected point, the signal voltage ± N/4 VDD is applied to the non-selected point whereby the cross-talk in the segment is completely eliminated and it enables the display to obtain good contrast.

Consequently, this display system of the present invention is preferable for use in an electronic watch and an electronic calculator which have a problem of a limited battery capacity since the display system of the present invention employs four kinds of voltage by using the booster circuit of low power consumption without a resistor voltage dividing circuit.

What is claimed is:

1. A liquid crystal display device comprising in combination: a liquid crystal display having a plurality of segment electrodes positioned to define a plurality of display figures; a divider for dividing a time-standard signal; a plurality of counters for counting the output of said divider; a gate circuit for transmitting the output signal of said counters in a time-sharing mode; a gate signal generator circuit for generating a gate signal and for applying the same to said gate circuit to control the operating mode of said gate circuit; a decoder for receiving the counter output signal transmitted through said gate circuit and for decoding the same to develop segment signals for enabling said segment electrodes; a segment electrode selecting circuit and a figure electrode selecting circuit each comprising a transmission gate to which the output signal of said decoder and said gate signal are applied as a control signal, each of the transmission gates comprising said selecting circuits respectively receiving a voltage higher than a threshold voltage of said liquid crystal display and a voltage lower than the threshold voltage, said transmission gates being connected so that the higher voltage is applied to the selected segment electrode alternately and the lower voltage is applied to the non-selected segment electrode whereby the display of each of the figures are driven by said gate-signal in the time sharing mode.

2. A liquid crystal display device as claimed in claim 1, further comprising means for applying voltages having levels V and 2V to said segment electrode signal generating circuit and said figure electrode signal generating circuit, respectively.

3. A display device of the matrix type comprising in combination: a plurality of longitudinal electrodes and horizontal electrodes which cross to define a plurality of display portions which are located at the cross points of said longitudinal and horizontal electrodes; a first switching group comprising a plurality of switches; means for developing a first pulse voltage NVDD which has an amplitude N times the amplitude of the standard voltage VDD which has a preferable repetition frequency; a second switching group comprising a plurality of switches; means for developing a second pulse voltage which has the opposite polarity to said first pulse voltage; said first switching group being connected to apply said first pulse voltage NVDD to selected ones of said horizontal electrodes; said second switching group being connected to apply said second pulse voltage to selected ones of the longitudinal electrodes so that a cross point portion is located between the selected longitudinal electrode and said selected horizontal electrode; means for applying a fourth signal voltage to a horizontal electrode not selected by said first switching group, said fourth signal having a direct current voltage amplitude of N/2 times the amplitude of said standard voltage and being opposite in polairty to said first pulse in one half period and having a direct current voltage amplitude of N/4 times the amplitude of said standard voltage in another half period, and having a signal voltage which is overlapped by a third pulse which is substantially higher than the repetition frequency of said first pulse and is N/4 times the amplitude of said standard voltage VDD and is equivalent to an average voltage of said first pulse voltage; and means for applying a fifth pulse voltage which has a polarity opposite to said fourth signal voltage to the longitudinal electrodes not selected by the switching members of said second switching group; whereby a signal voltage which is N times said standard voltage VDD is applied to the cross point for displaying, and a lower voltage lower than the threshold voltage of the display device is applied to each non-selected point.

* * * * *